April 21, 1959    R. H. BOOTH ET AL    2,882,864
AUTOMATIC MACHINE CONTROL SYSTEMS
Filed Feb. 10, 1955

Inventors
R. H. Booth
E. M. Payne
By Ghesen Downing Seeble Attys

United States Patent Office 2,882,864
Patented Apr. 21, 1959

2,882,864

AUTOMATIC MACHINE CONTROL SYSTEMS

Richard Herbert Booth, Beaconsfield, and Edwin Malcolm Payne, Chorleywood, England, assignors to Electric & Musical Industries Limited, Hayes, Middlesex, England, a British company Application February 10, 1955, Serial No. 487,441

Claims priority, application Great Britain February 12, 1954

3 Claims. (Cl. 121—41)

This invention relates to automatic control systems for producing displacement of a relatively massive part, such for example as the worktable of an automatic machine.

Various proposals have been made heretofore for the construction of automatic machines for cutting or otherwise shaping workpieces, as for example in the specifications of United States patent application Serial Nos. 459,814, 463,017 now Patent No. 2,808,548 issued October 1, 1957 and 466,870.

The instructions for the machine may be derived from a record, such for example as a punched tape or a magnetic tape on which the instructions are recorded in a digital code form, or alternatively in analogue form in the case of a magnetic tape. The instructions derived from the record may be converted into an electrical voltage which is an analogue of the instructions and is applied to servo means which displace one or more parts of the machine in response to the instructions. The servo means may for example displace a cutter or a worktable of the machine.

An automatic machine such as described in the preceding paragraph may be required to operate with a high degree of accuracy. However the part or parts of the machine which have to be displaced by the servo means are usually relatively massive and when the machine is in operation may be relatively heavily loaded. Consequently a lead screw or other means for imparting displacement in response to the output of the servo-mechanism is liable to wear, and lose its accuracy relatively quickly. Moreover it may be of relatively coarse construction, so that the necessary degree of accuracy may be difficult to attain initially.

The object of the present invention is to reduce the difficulties indicated in the preceding paragraph.

According to the present invention there is provided an automatic control system comprising means responsive to a record for deriving an electrical signal which varies to represent a desired displacement, a part to be displaced in response to said signal, hydraulic servo means including a hydraulic ram connected to said part and valve means actuable in a first sense to produce displacement of means actuable in a first sense to produce displacement of said ram in a forward direction and actauble in a second sense to produce displacement of said ram in the reverse direction, interengaging male and female threaded members, an electric servo motor for producing relative rotation between said threaded members to displace one of said members axially along the other members, a potentiometer driven by said electric servo motor to derive an electrical signal variable to represent the displacement of said one member along said other member, means for comparing the signal derived from said record with the signal derived from said potentiometer to produce a difference signal, said electrical servo motor being responsive to said difference signal to produce said relative rotation, error sensing means for sensing relative displacement between said one threaded member and said part, said valve means being selectively actuable in said first and second senses by said error sensing means in dependence upon the sense of said relative displacement, to cause said ram to tend to minimise said relative displacement.

In order that the invention may be clearly understood and readily carried into effect, the invention will be described with reference to the accompanying drawings, in which.

Figure 1:
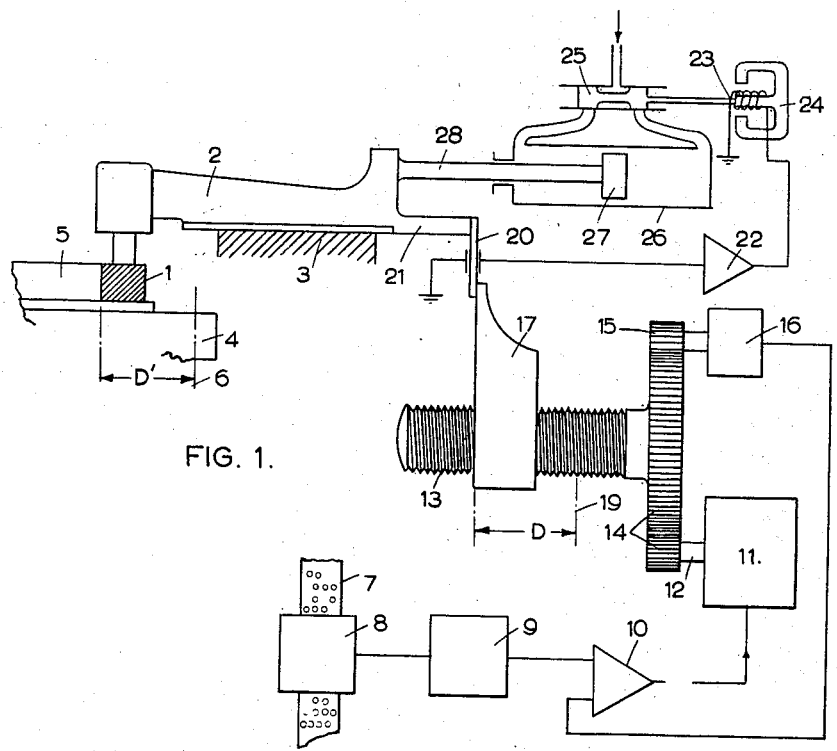
Figure 1 illustrates diagrammatically and partly in block form one example of an automatic milling machine in accordance with the present invention, and in which sensing means in the form of a piezo electric crystal is employed.

Referring to the drawing, reference 1 illustrates the cutter of a vertical milling machine. The cutter is rotatable in suitable bearings in a head 2 which is mounted for horizontal movement in a predetermined direction on suitable bearings represented diagrammatically at 3. The worktable of the machine is indicated at 4, and in order to mill a workpiece such as represented by the reference 5, the workpiece is secured on the table and the table is rotated at a predetermined angular speed whilst the cutter 1 is displaced, by horizontal movement of the head 2, to different distances from the axis of the worktable. In the present example it will be assumed, for purposes of illustration that the displacements of the cutter are measured with reference to a datum position indicated by the dot-and-dash lines 6, this line being displaced from the axis of the worktable by a distance equal to the maximum radius which can be cut.

Instructions for the displacement of the head 2 are derived from a record in the form of a punched tape, a fragment of which is indicated at 7. The record may alternatively be in the form of a magnetic tape. The instructions which are recorded on the tape in a digital code, are read by means of a tape reader denoted by the block 8 and are then converted into an electrical voltage which is the analogue of the displacement which has to be imparted to the head 2 at any instant. The conversion is effected by a device represented in block form at 9 which may be of any suitable construction such as described for example in the specification of United States patent application Serial No. 459,814. The instructions derived from the converter 9 are in the form of a virtually continuously variable electrical voltage and this voltage forms one input signal to an amplifier 10 whose output constitutes the error signal input for a servo-motor 11. If the record is a magnetic tape, instructions may be recorded initially as a continuously variable analogue signal, in which case a digital-to-analogue converter is not necessary. The servo-motor may be a relatively small electric motor and the shaft 12 of the motor, whose angular displacements at any instant should be analogous to the voltage output of the converter 9, drives a precisely cut lead screw 13 through suitable gearing 14. An analogue of the actual angular displacement of the lead screw 13 is in turn derived by gearing 15 and a suitable mechanical-to-electrical converter 16, which may be a potentiometer. The converter 16 sets up an analogue signal of the same kind as that derived from the converter 9 and this signal is fed back with negative polarity to the input of the amplifier 10. The resultant input to the amplifier 10 therefore represents the error in the servo-loop and the servo operates in known manner to tend to reduce this error to zero. An element of relatively small mass in the form of a nut 17 is mounted non-rotatably on the lead screw 13 and at any instant, displacement of the face 18 of the nut from a given datum indicated by the dot and dash line 19 represents the displacement which has to be imparted to the active face of the cutter 1 from the aforesaid datum 6. A pressure sensitive element in the form of a piezo-electric crystal 20 of the kind used in a phonograph pick-up is mounted in any suitable manner on the nut 17 so that an edge portion of the crystal contacts the face 18 of the nut 17. The crystal may in fact be mounted in a similar manner to that of a phonograph pick-up. An opposite edge portion of the crystal is mechanically coupled, for example by an abutment 21, to the head 2 and an electrical output is picked up from the crystal in known manner and applied to an amplifier 22, said output being dependent upon the pressure imparted to the crystal by the nut 17 and the head 2. The output of the amplifier 22 is applied to the energising winding 23 of an electromagnet 24 and the armature of the electro-magnet is mechanically connected to a valve 25 which controls the flow of fluid, to a hydraulic ram 26. The piston 27 of the ram is connected by rod 28 to the head 2 of the milling machine. The valve 25 and its control mechanism are so adjusted that for a predetermined pressure on the crystal 20, no pressure is imparted by the ram 26 to the head 2 and this is arranged to occur when the displacements D and D' of the nut 17 and the cutter 1 from there respective datum positions 19 and 6 are equal. If the pressure on the crystal is less than said predetermined value the head 2 is displaced in one sense by the action of the ram and if the pressure on the crystal is greater than said predetermined value the head 2 is displaced in the opposite sense. Therefore the hydraulic ram 26 is responsive to the pressure on the crystal 20, which senses relative displacement between the cutter 1 and the nut 17, and serves to displace the cutter 1, so as to tend to maintain said relative displacement zero.

Cut-out means may also be provided to prevent overloading of the crystal 20.

With the arrangement described it will be appreciated that the accuracy of displacement of the cutter 1 is referred to the displacement of the nut 17. Moreover the nut 17 is only lightly loaded and therefore the lead screw 13 may have a fine pitch and may be made with a high degree of precision and can maintain this precision over long periods.

Figure 2:
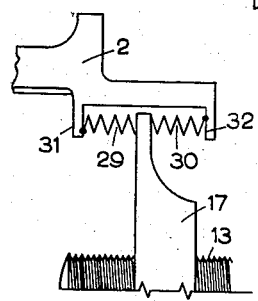
Figure 2 illustrates a modification of Figure 1 in which the sensing means comprises resistive strain gauges.

In the modification illustrated in Figure 2, two resistive strain gauges indicated diagrammatically by the references 29 and 30 constitute the means for sensing relative displacement between the nut 17 and the head 2. The strain gauges are mounted between opposite surfaces of the nut 17 and abutments 31 and 32 on the head 2, as indicated, but are insulted from the nut and abutments. The strain gauges may be of a known construction and the resistances of the gauges are sensitive to relative displacement between the nut 17 and the head 2. In operation, electrical signals responsive to the resistance variations are derived from the gauges by passing current through them and these signals are differentially combined to produce in known manner an input signal for the amplifier 22.

Figures 3, 4:
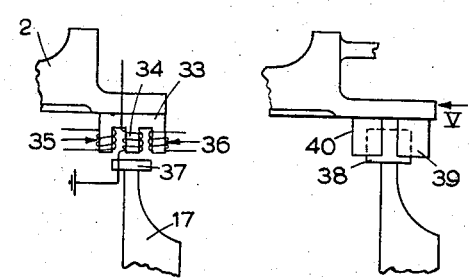
Figure 3 illustrates another modification of Figure 1 in which the sensing means comprises an electro-magnetic device.
Figure 4 illustrates another modification of Figure 1 in which the sensing means comprises differentially variable capacitors.
Figure 5:
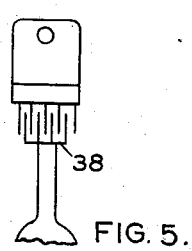
Figure 5 is another view of Figure 4 looking in the direction of the arrow V.

In the modification illustrated in Figure 3 the sensing means takes the form of a magnetic core 33 fixed to the head 2 and having three parallel limbs as shown. The central limb carries an energising winding 34 to which an alternating current is supplied, on operation of the machine. The outer limbs carry pick-up windings 35 and 36 and the voltages generated across these windings are differentially combined and rectified to provide the input signal for the amplifier 22. The nut 17 carries an armature 37 and when the armature 37 is centred accurately with respect to the limb 34 the two magnetic circuits formed by the core 33 and armature 37 are balanced. Consequently the voltages generated by the coils 35 and 36 are equal so that the input signal to the amplifier 22 is zero, corresponding to the equilibrium position of the ram 26. If however any relative displacement occurs between the head 2 and the nut 17, the magnetic circuits are unbalanced and the input signal to the amplifier 22 then has the effect of causing the ram 26 to operate so as to tend to reduce the unbalance. In this form of the invention, the head 2 and nut 17 are assumed to be made of non-magnetic material.

According to Figure 4 the sensing means comprise a series of capacitor electrodes 38 secured to and insulated from the nut 17. The electrodes 38 are interleaved at one end with a row of capacitor electrodes 39 fixed to but insulated from the head 2 whilst at the other end they are interleaved with a second row of capacitor electrodes 40 also carried by but insulated from the head 2. Relative displacement between the nut 17 and head 2 varies in opposite senses the capacities provided on the one hand by the electrodes 38 and 39 and on the other hand by the electrodes 38 and 40. Such differential variation is employed to unbalance an electric circuit and produce an input signal for the amplifier 22 in known manner.

Figure 6:
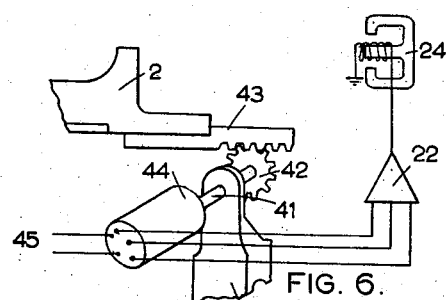
Figure 6 is another modification of Figure 1 in which the sensing means comprises an electro-magnetic device.

The modification of the invention illustrated in Figure 6 is a variant of Figure 3. A shaft 41 is freely rotatable on the nut 17 and at one end carries a pinion 42, which meshes with a short rack 43 attached to the head 2. The shaft 41 carries the rotor of a magslip transmitter 44 which may be of the construction described in the Journal of the Institution of Electrical Engineers, volume 94, part IIA, page 227 et seque. The magslip is polarised by a signal applied via the leads 45 and the output of the field windings of the magslip are differentially amplified in the amplifier 22 and employed to operate the electromagnet 24. This operation is in principle the same as that of Figure 3, except that a linear movement of an armature is replaced by an angular movement. It will be appreciated that rotation will be imparted to the pinion 42 only in the event of relative displacement between the nut 17 and the head 2, and the control on the head initiated by the output of the magslip 44 tends to reduce such relative displacement to zero.

The invention has been illustrated as applied to a milling machine in which the movements are referred to cylindrical co-ordinates, but other co-ordinate systems, for example Cartesian co-ordinates, may be used. The invention is, moreover, not restricted to vertical milling machines.

In the example illustrated, the means for sensing relative displacement between the head 2 and the nut 17 is of such a character that an electrical signal is generated representing the relative displacement, and the electrical signal in turn produces a movement of a valve controlling a hydraulic ram. However the relative displacement may be used to operate the valve directly. Optical means for sensing relative displacement may also be used. For example, the relative displacement could be employed to tilt a mirror and deflect a beam of light to one or other of two light measuring devices, comprising photo-electric cells, which convert the difference between the light inputs to the measuring devices into an electrical signal input for the amplifier 22. Furthermore, where part of the means for sensing the relative displacement between the nut and the head is mounted on the nut it can of course be mounted on the head, and vice versa. Moreover, instead of deriving the feedback analogue signal from the shaft 13, as in Figure 1, it may be derived from the nut 17 by causing the nut to operate the slider of a potentiometer.

The invention is not confined to milling machines and is generally applicable to automatic machines for cutting or otherwise shaping workpieces and especially metal workpieces.

What we claim is:

1. An automatic control system comprising means responsive to a record for deriving an electrical signal which varies to represent a desired displacement, a part to be displaced in response to said signal, hydraulic servo means including a hydraulic ram connected to said part and valve means actuable in a first sense to produce displacement of said ram in a forward direction and actuable in a second sense to produce displacement of said ram in the reverse direction, inter-engaging male and female threaded members, an electric servo motor for producing relative rotation between said threaded members to displace one of said members axially along the other member, a potentiometer driven by said electric servo motor to derive an electrical signal variable to represent the displacement of said one member along said other member, means for comparing the signal derived from said record with the signal derived from said potentiometer to produce a difference signal, said electrical servo motor being responsive to said difference signal to produce said relative rotation, error sensing means for sensing relative displacement between said one threaded member and said part, said valve means being selectively actuable in said first and second senses by said error sensing means in dependence upon the sense of said relative displacement, to cause said ram to tend to minimise said relative displacement.

2. A system according to claim 1, said error sensing means comprising a piezo-electric crystal mounted to be subjected to pressure variations when relative displacement between said machine part and said one threaded member occurs, to cause said crystal to produce said electrical error signal.

3. A system according to claim 1, said error sensing means comprising a pinion and a tooth member engaged with said pinion, said pinion and tooth member being mounted one on said machine part and the other on said one threaded member, and means operable by said pinion for deriving said electrical error signal.

References Cited in the file of this patent

UNITED STATES PATENTS

| | | |
|---|---|---|
| 2,398,421 | Frische | Apr. 16, 1946 |
| 2,403,917 | Gille | July 16, 1946 |
| 2,437,603 | Hornfeck | Mar. 9, 1948 |
| 2,533,042 | Polson | Dec. 5, 1950 |
| 2,644,427 | Sedgfield | July 7, 1953 |
| 2,674,232 | Mason | Apr. 6, 1954 |
| 2,710,934 | Senn | June 14, 1955 |